(12) United States Patent
Connally et al.

(10) Patent No.: US 7,720,793 B2
(45) Date of Patent: May 18, 2010

(54) METHOD AND SYSTEM FOR SELECTIVELY PROCESSING TEST DATA USING SUBSCRIPTIONS IN A MULTI-FORMATTER ARCHITECTURE

(75) Inventors: Carli Connally, Fort Collins, CO (US); Bryan F. Carpenter, Loveland, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 356 days.

(21) Appl. No.: 11/345,197

(22) Filed: Jan. 31, 2006

(65) Prior Publication Data

US 2007/0192366 A1 Aug. 16, 2007

(51) Int. Cl.
G06F 17/30 (2006.01)
(52) U.S. Cl. ..................................... 707/101
(58) Field of Classification Search ............. 707/1, 707/10, 101, 103 R, 104.1; 715/239; 701/29; 711/147; 709/246; 717/174; 700/86
See application file for complete search history.

(56) References Cited

U.S. PATENT DOCUMENTS

| | | | | |
|---|---|---|---|---|
| 7,313,576 B2 * | 12/2007 | Clark et al. | ............... | 707/203 |
| 2002/0138582 A1 * | 9/2002 | Chandra et al. | ............. | 709/206 |
| 2005/0246390 A1 * | 11/2005 | House et al. | ................ | 707/200 |
| 2007/0053513 A1 * | 3/2007 | Hoffberg | .................... | 380/201 |
| 2007/0100967 A1 * | 5/2007 | Smith et al. | ................. | 709/219 |
| 2007/0179732 A1 * | 8/2007 | Kolman et al. | ............. | 702/118 |

* cited by examiner

Primary Examiner—Diane Mizrahi
(74) Attorney, Agent, or Firm—Holland & Hart, LLP

(57) ABSTRACT

In an embodiment, there is disclosed a system for selectively processing test data using subscriptions in a multi-formatter architecture. The system includes a set of designators specifying types of data; a set of formatters for writing data to files; and a monitor for polling the formatters for designators and for reviewing the data. In an embodiment, a method of selectively processing test data using subscriptions in a multi-formatter architecture is disclosed. The method includes specifying types of data with a set of designators; polling each one of a set of data formatters to identify specified types of data needed for writing data to files; and reviewing data to identify data corresponding to the designators identified in the polling of the formatters; and storing data corresponding to the designators identified in the polling of the formatters. Other embodiments are also disclosed.

12 Claims, 16 Drawing Sheets

Example code to demonstrate a way of specifying the different subscribable events and data:

```
struct DLEvents
{
  typedef enum
  {
    TestProgStart      = 1,
    TestProgEnd        = 2,
    LotStart           = 3,
    LotEnd             = 4,
    WaferStart         = 5,
    WaferEnd           = 6,
    TestFlowStart      = 7,
    TestFlowEnd        = 8,
    TestFunctionStart  = 9,
    TestFunctionEnd    = 10,
    Test               = 11,
    BinReached         = 12
  } Choice;
};

struct SubscriptionSpec
{
  void registerForDLEvent(const DLEvents::Choice & eventChoice);
};
```

FIGURE 1A

METHOD AND SYSTEM FOR SELECTIVELY PROCESSING TEST DATA USING SUBSCRIPTIONS IN A MULTI-FORMATTER ARCHITECTURE

BACKGROUND

For device testing systems that operate during the actual testing process, it is important to minimize the use of a computer's resources. Such minimization of computer resources preferably includes conservation of both memory usage and processor time. However, in a typical system, all test data is made available to a client writer. This includes test data will not be used by one or more of the clients.

Methods and systems that involve distribution of all test data may function but are not efficient as the client writer needs to spend time responding to each of the events of the test data. However, some of these events may later be ignored. Memory usage and processor time may be unnecessarily burdened as all of the test data must be stored in memory and each of the clients must respond to each of these ignored events.

SUMMARY OF THE INVENTION

In an embodiment, there is provided a system for selectively processing test data using subscriptions in a multi-formatter architecture, the system comprising a set of designators specifying types of test data, wherein each of the designators corresponds to an individual type of test data; a set of client formatters for writing the test data to output files, and each one of the client formatters identifying at least one of the designators corresponding to types of test data needed for writing the test data to output files; and a monitor for polling the client formatters for ones of the set of designators in the set of client formatters, and the monitor for reviewing the test data, wherein the monitor allows storage of the test data corresponding to the ones of the designators identified in the polling of the client formatters.

In another embodiment, there is provided a method of selectively processing test data using subscriptions in a multi-formatter architecture, the method comprising specifying types of test data with a set of designators, wherein each of the designators corresponds to an individual type of test data; polling each one of a set of data formatters to identify ones of the specified types of test data needed for writing the test data to output files; and reviewing the test data to identify test data corresponding to the ones of the set of designators identified in the polling of the data formatters; and storing test data corresponding to the ones of the set of designators identified in the polling of the data formatters.

Other embodiments are also disclosed.

BRIEF DESCRIPTION OF THE DRAWINGS

Illustrative embodiments of the invention are illustrated in the drawings, in which:

FIG. 1A illustrates example code for subscribable events and data for use in the system shown in FIG. 1;

DETAILED DESCRIPTION OF AN EMBODIMENT

Figure 1:
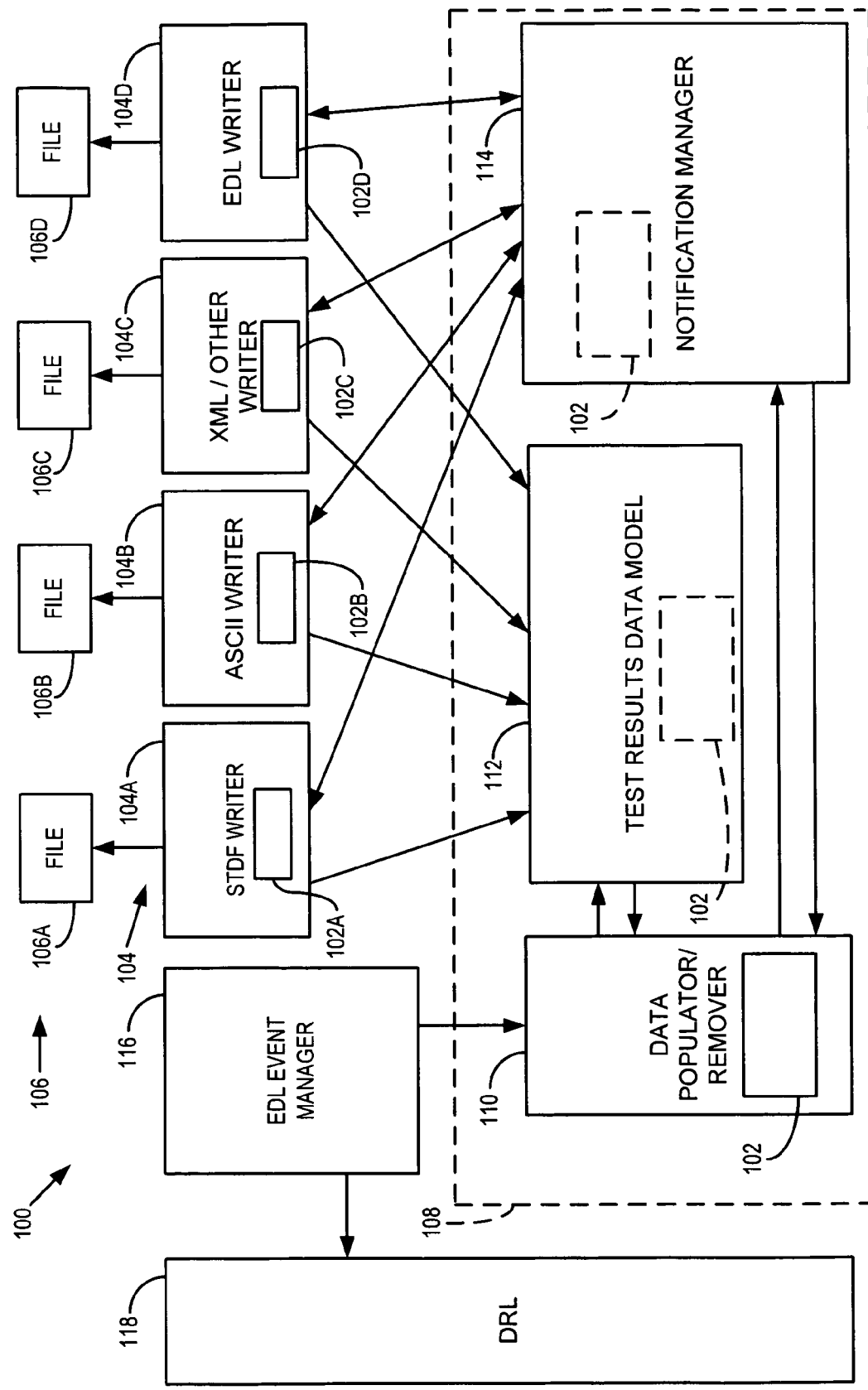
FIG. 1 illustrates a schematic views of a system for processing test data in a multi-formatter architecture.

Looking at FIG. 1, there is shown a system 100 for selectively processing test data using subscriptions in a multi-formatter architecture. In an embodiment, system 100 may include a set of designators 102 specifying types of data; a set of formatters 104 for writing data to files 106; and a monitor 108 for polling formatters 104 for designators 102 and for reviewing the data.

Referring again to FIG. 1, there is shown system 100 for selectively processing test data using subscriptions in a multi-formatter architecture. In an embodiment, system 100 may comprises set of designators 102 specifying types of test data. Each of designators 102 corresponds to an individual type of test data.

System 100 may comprise a set of client formatters 104 for writing the test data to output files 106. Each one of client formatters 104 may identify at least one of the designators 102 corresponding to types of test data needed for writing the test data to output files 106. For example, client formatters 104 may be individually identified as formatter 104A, formatter 104B, formatter 104C and formatter 104D, and each of these formatters 104A-104D may include individualized sets of designators 102 such as designators 102A, designators 102B, designators 102C and designators 102D, respectively. Additionally, formatters 104, and individual ones of formatters 104A-104D, are referred to hereinbelow using the terms client, formatter, and writer.

System 100 may comprise monitor 108 for polling the client formatters 104A-104D for ones of the set of designators 102A-102D in the set of client formatters 104A-104D, respectively. System 100 may comprise monitor 108 for reviewing the test data. Monitor 108 may allow storage of the test data corresponding to the ones of the designators 102A-102D identified in the polling of client formatters 104A-104D. In an embodiment, a master list of designators 102 are stored in monitor 108 for comparison with test data received into system 100. In one embodiment, monitor 108 may include a data populator/remover 110, a test results data model 112 and a notification manager 114. The master list of designators 102 may be stored in data populator/remover 110, data model 112 or notification manager 114.

In an embodiment, monitor 108 allows bypass of the test data corresponding to the designators 102 not identified in the polling of the client formatters 104A-104D. Test data may include data objects. In one embodiment, monitor 108 may include data populator/remover 108 for generating data objects from the test data.

In one embodiment, data model 112 may be provided for storage of the test data corresponding to the ones of designators 102A-102D identified in the polling of client formatters 104A-104D. Data populator/remover 110 may have code for the bypass of the test data corresponding to designators 102 not identified in the polling of client formatters 104A-104D. In an embodiment, the code of data populator/remover 110 may allow bypass of the test data prior to generation of the data objects. In another embodiment, the code of the data populator/remover 110 may allow bypass of the test data prior to storage thereof.

In an embodiment, for example, client formatters 104A-104F may include, for example, an STDF writer 104A, an ASCII writer 104B, an XML writer 104C, and an EDL writer 104D.

As discussed above, systems and methods for selectively storing relevant test data may operate primarily during the actual device testing process. Therefore, it is often very important to minimize the use of computer resources both in terms of processor time and memory usage.

In an embodiment, a variety of types of client formatters 104 may be implemented. In one embodiment, some or all of the specific client formatters may be configured to write specific types of data chosen in the future. In order to meet performance objectives with systems and methods for selectively storing relevant test data, it is important to avoid doing work to create and organize information that ends up not being used by any client 104.

In the absence of a targeted subscription mechanism, all data from an event logging source, such as an EDL event manager 116, which in turn may receive test data either from a data retrieval library, such as a DRL 118, or from a test device in real-time, is generally populated into data model 112. In turn, every client is notified about each new increment of populated data. While systems and methods that populate all of the data into data model 112 and notify each of clients 104 about all of the data may function, clients 104 generally need to spend time responding to events that are later ignored.

In an embodiment, system 100 may allow each client 104 to specify which types of events it is interested in, and then to only deliver the specified events to that client 104.

Two independent areas to avoid additional computation include (1) optional data model population and (2) optional event notification. For optional data model population, it is generally advantageous to avoid populating some structures into the data model if no client 104 cares about them. Each structure placed into data model 110 takes up memory space and takes processing time to calculate and fill in its data values. For optional event notification, one type of client formatter 104 might need to be notified every time a new test has executed and generated a result, while another type of client 104 might only be interested in an event about the completion of a test suite because it only wants to collect overall statistics.

The class that represents a client formatter 104 may implement an interface that the main program uses to interact with it. The interface may include code as follows:

```
class ClientFormatter {
public:
    virtual void initialize(SubcriptionSpec & spec) = 0;
    virtual void handleNotification(const
        vector<NotificationToken>& tokens) = 0;
};
```

When a client formatter 104 is initially called, it makes method calls on a subscription object in order to specify the notifications it wants to receive. Then, once the data starts flowing, the client formatter receives a series of calls that give it an opportunity to act on its event queue tokens. Note that while the high-priority main thread is used to put data into event queues, the lower-priority client threads are used to deliver events using the call. This means that a low-priority formatter might have data stack up in its queue if its thread does not run for a time.

Client 104 may specify particular events it wants to receive by defining a set of enumerated values that correspond to possible events.

Referring to FIG. 1A, there is shown example code to demonstrate a way of specifying the different subscribable events and data. In an embodiment, selective population of data model objects does not populate the "test result" data model object if no formatter 104 asks for events related to it. In another embodiment, there is provided the ability to not populate other objects working toward a base of a data tree formed by the data model objects. There is no need to explicitly check each access a formatter 104 makes to data model 110 to see whether formatter 104 subscribed to the data model object.

Figure 1B:
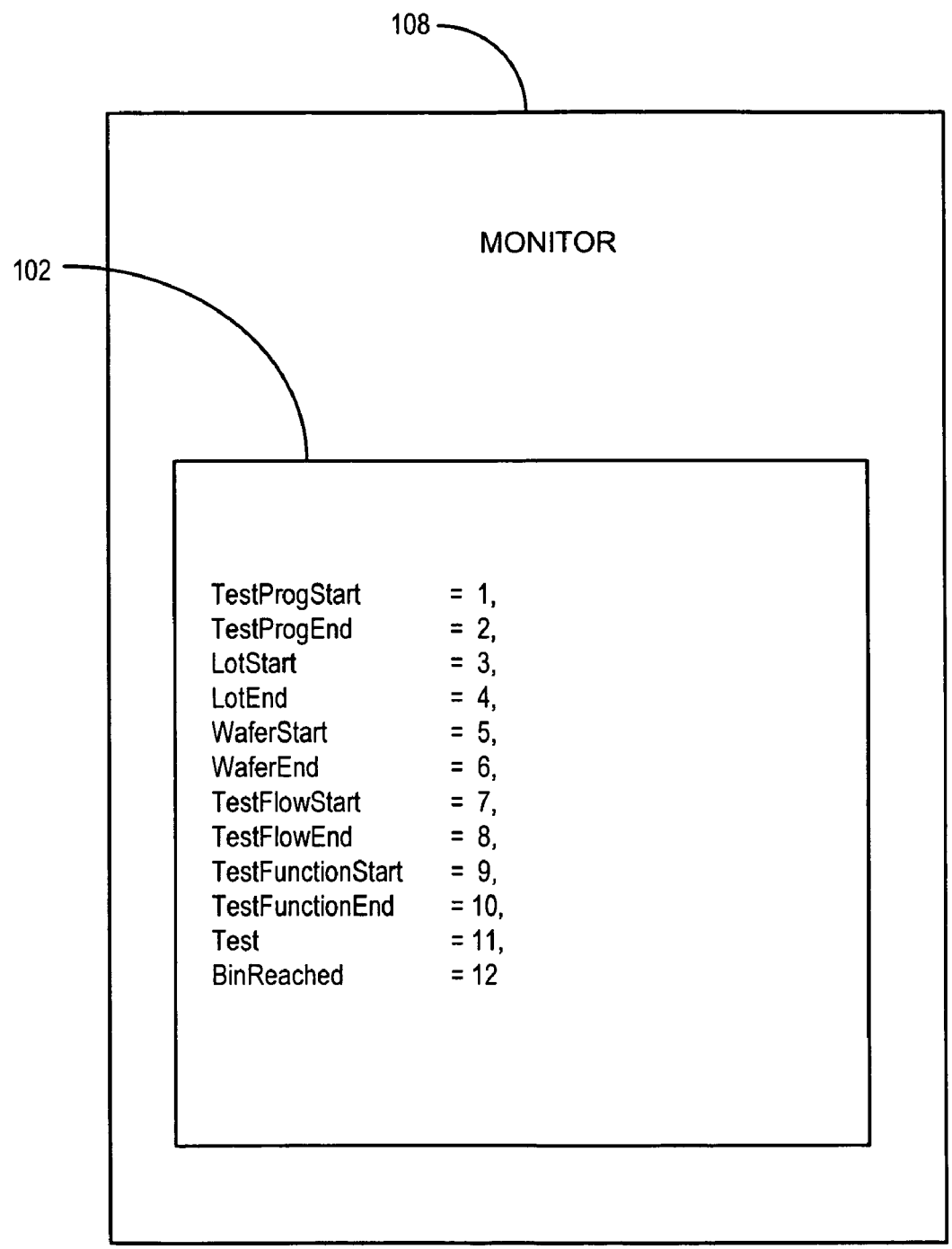
FIG. 1B illustrates a set of designators stored on a data populator/remover or monitor of the system shown in FIG. 1.

Looking at FIG. 1B, there is shown an example of designators 102, which are stored on monitor 108, and correspond to the code shown in FIG. 1A.

Figure 1C:
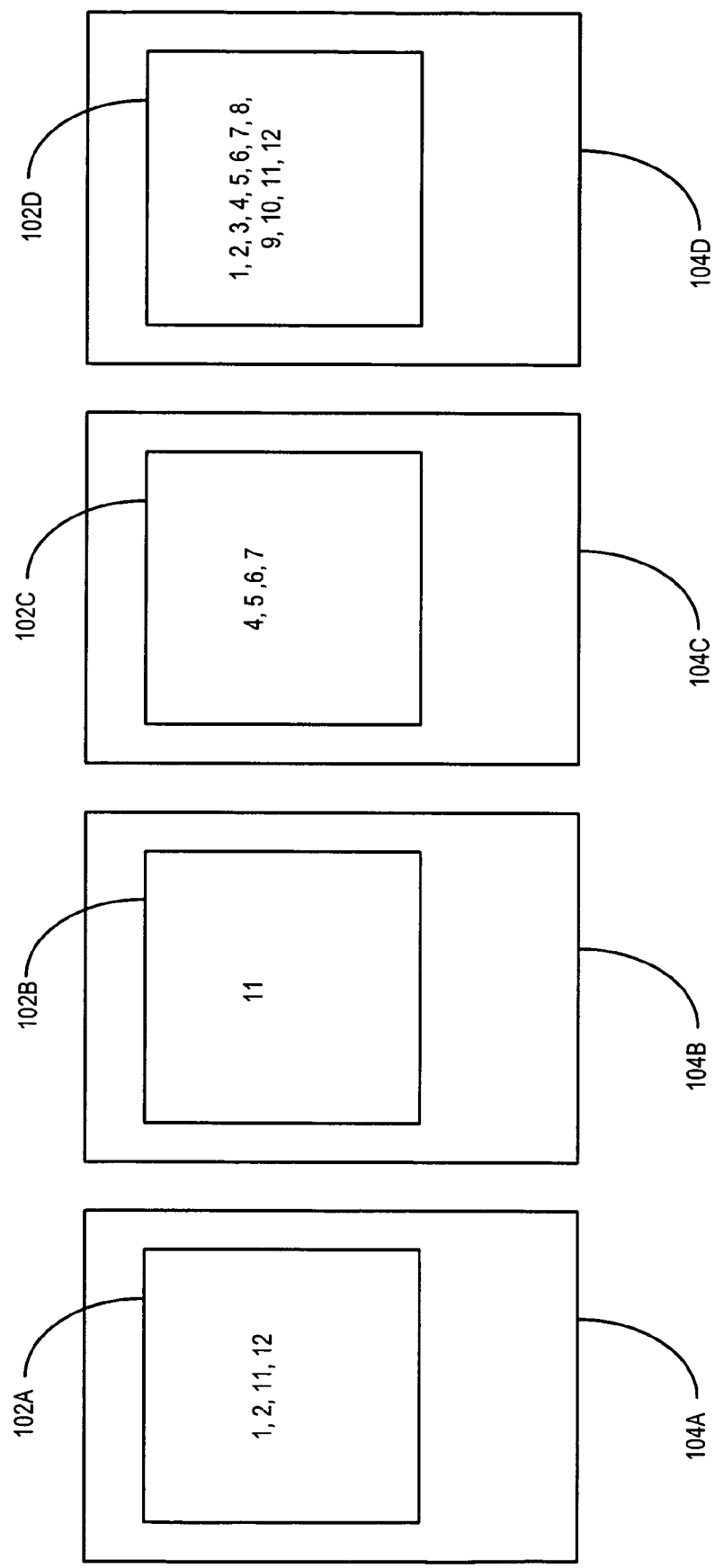
FIG. 1C illustrates designators for needed data stored on individual writers.

Referring to FIG. 1C, there is shown designators 102A-102D stored on individual writers 104A-104D, respectively, for identifying needed data.

Referring again to FIG. 1, in the case of the test result object, if no formatter 104 receives notifications through which it can retrieve a reference to a specific test result object, there will be no way any formatter 104 could possibly even make an attempt to access the specific test result object. This is because no other data model objects allow a formatter 104 to traverse toward these "leaves" of the tree containing such objects.

In some embodiments, an object may create some stub formatters, formatter ports and formatter groups. These objects and collections may be housed in and handled by a formatter manager object and a notification manager object. At initialization, the notification manager object passes a pointer to the formatter manager object. This pointer is retained by the notification manager for later use to deliver notifications. Then, notification manager 114 calls on formatters 104 to get the complete list of formatter ports. Notification manager 114 goes through the list, looking at the subscription information (which may be held inside each formatter port object) and accumulating a set of subscribers for each type of notification.

Later during runtime, when notification manager 114 needs to deliver a notification to formatters 104, it looks up the correct subscriber set for the notification type that it is delivering, and calls formatters 104 to pass the notification token and the subscriber set.

Inside STDF formatter 104A, there may be a switch statement with cases in place to handle certain notification types. This is where to look to decide which notifications to subscribe to. If a formatter 104 is set up to make use of a particular notification type, then it needs to make sure it specifies during execution of its initialization method that it wants to receive that notification.

Figure 2:
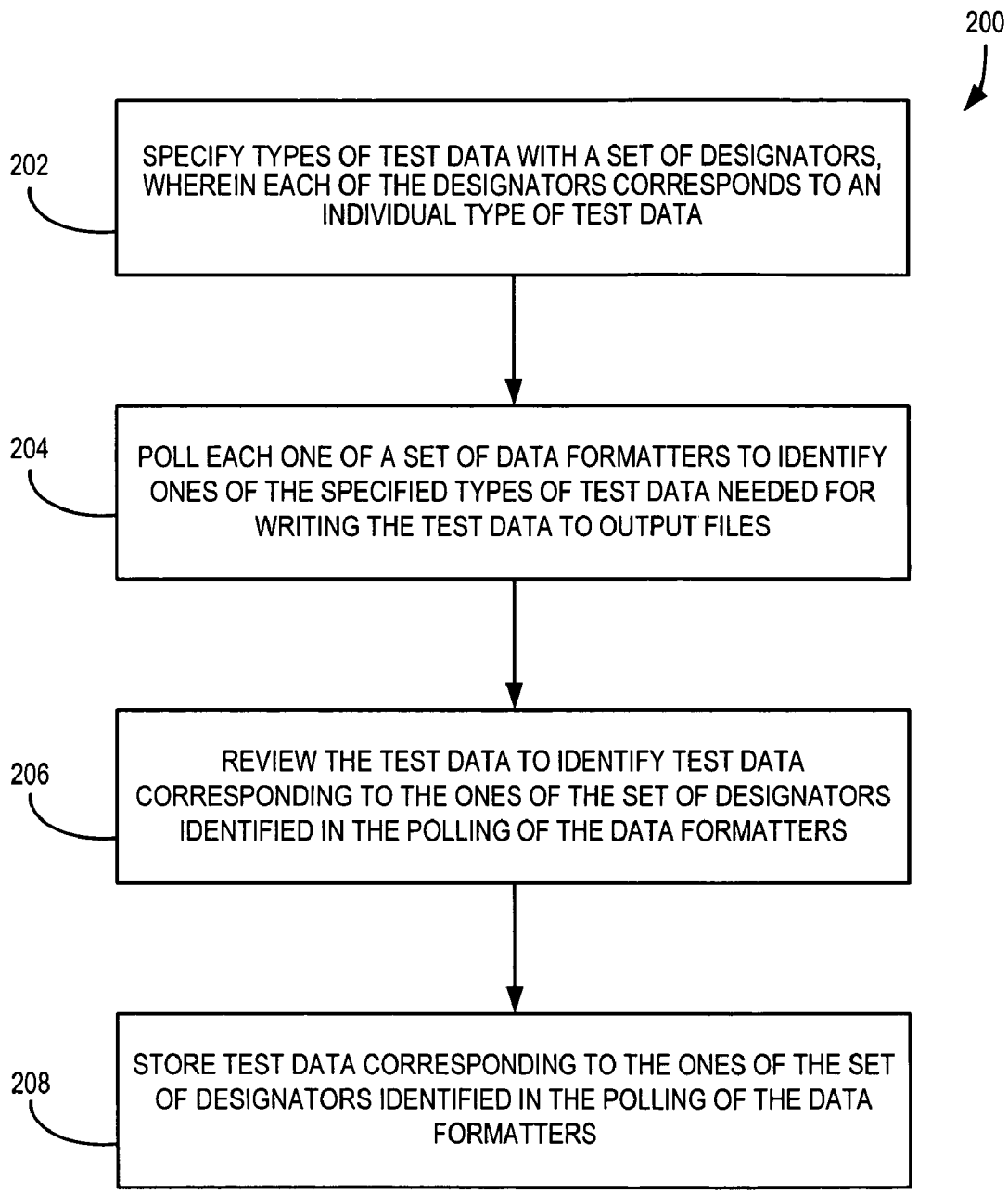
FIGS. 2-13 illustrate various methods of processing test data in a multi-formatter architecture.

Referring to FIG. 2, there is shown method 200 of selectively processing test data using subscriptions in a multi-formatter architecture. In an embodiment, method 200 may comprise the step of specifying 202 types of test data with a set of designators. Each of the designators corresponds to an individual type of test data. Method 200 may also comprise the step of polling 204 each one of a set of data formatters to identify ones of the specified types of test data needed for writing the test data to output files. Method 200 may further comprise the step of reviewing 206 the test data to identify test data corresponding to the ones of the set of designators identified in the polling of the data formatters. Method 200 may comprise the step of storing 208 test data corresponding to the ones of the set of designators identified in the polling of the data formatters.

Figure 3:
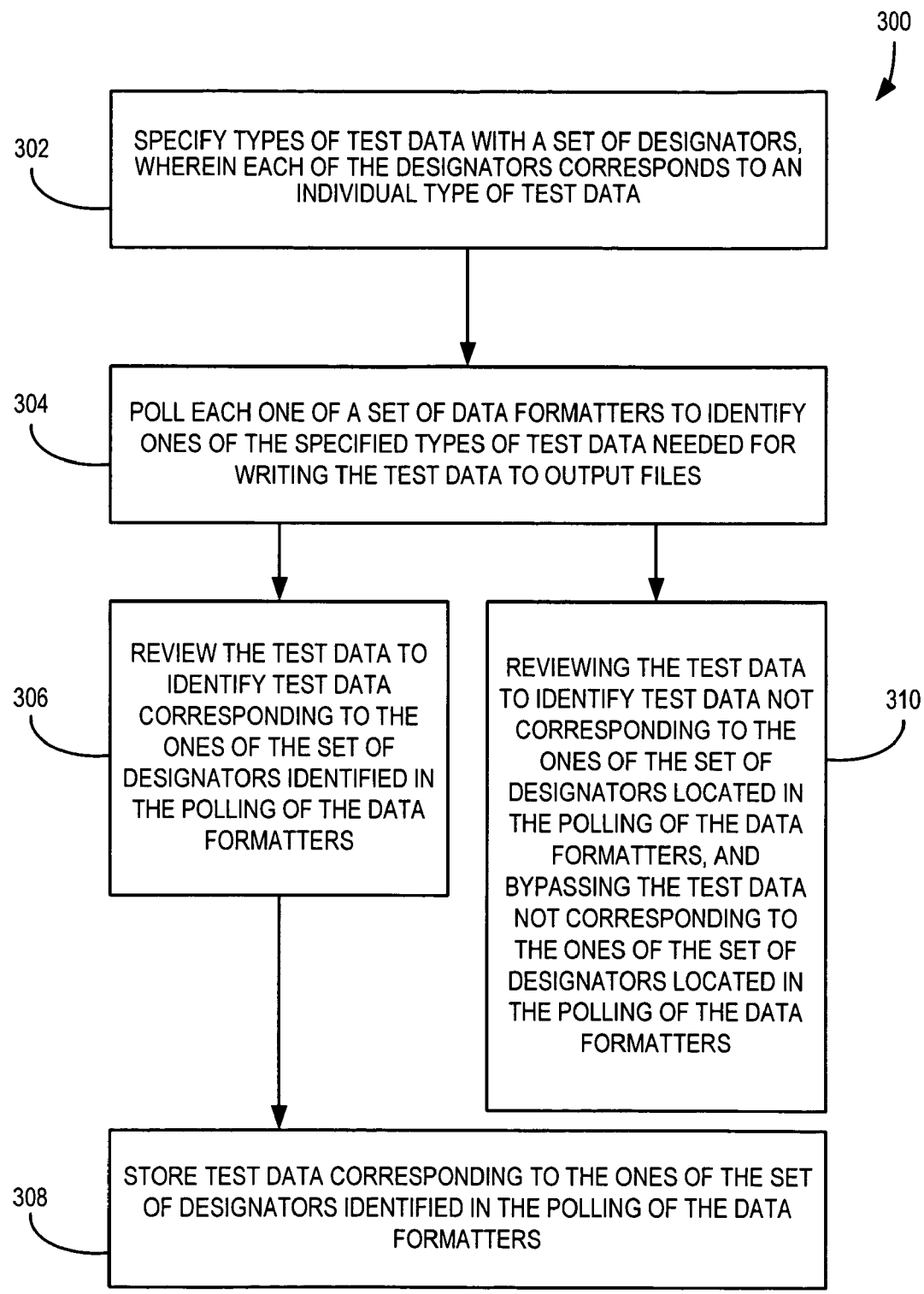

Referring to FIG. 3, there is shown a method 300 of selectively processing test data using subscriptions in a multi-formatter architecture. In an embodiment, method 300 may include the steps of method 200.

Method 300 may comprise the step of specifying 302 types of test data with a set of designators. Each of the designators corresponds to an individual type of test data. Method 300 may also comprise the step of polling 304 each one of a set of data formatters to identify ones of the specified types of test data needed for writing the test data to output files. Method 300 may further comprise the step of reviewing 306 the test data to identify test data corresponding to the ones of the set of designators identified in the polling of the data formatters. Method 300 may comprise the step of storing 308 test data corresponding to the ones of the set of designators identified in the polling of the data formatters.

Method 300 may further include the step of reviewing 310 the test data to identify test data not corresponding to the ones of the set of designators located in the polling of the data formatters, and bypassing the test data not corresponding to the ones of the set of designators located in the polling of the data formatters.

Figure 4:
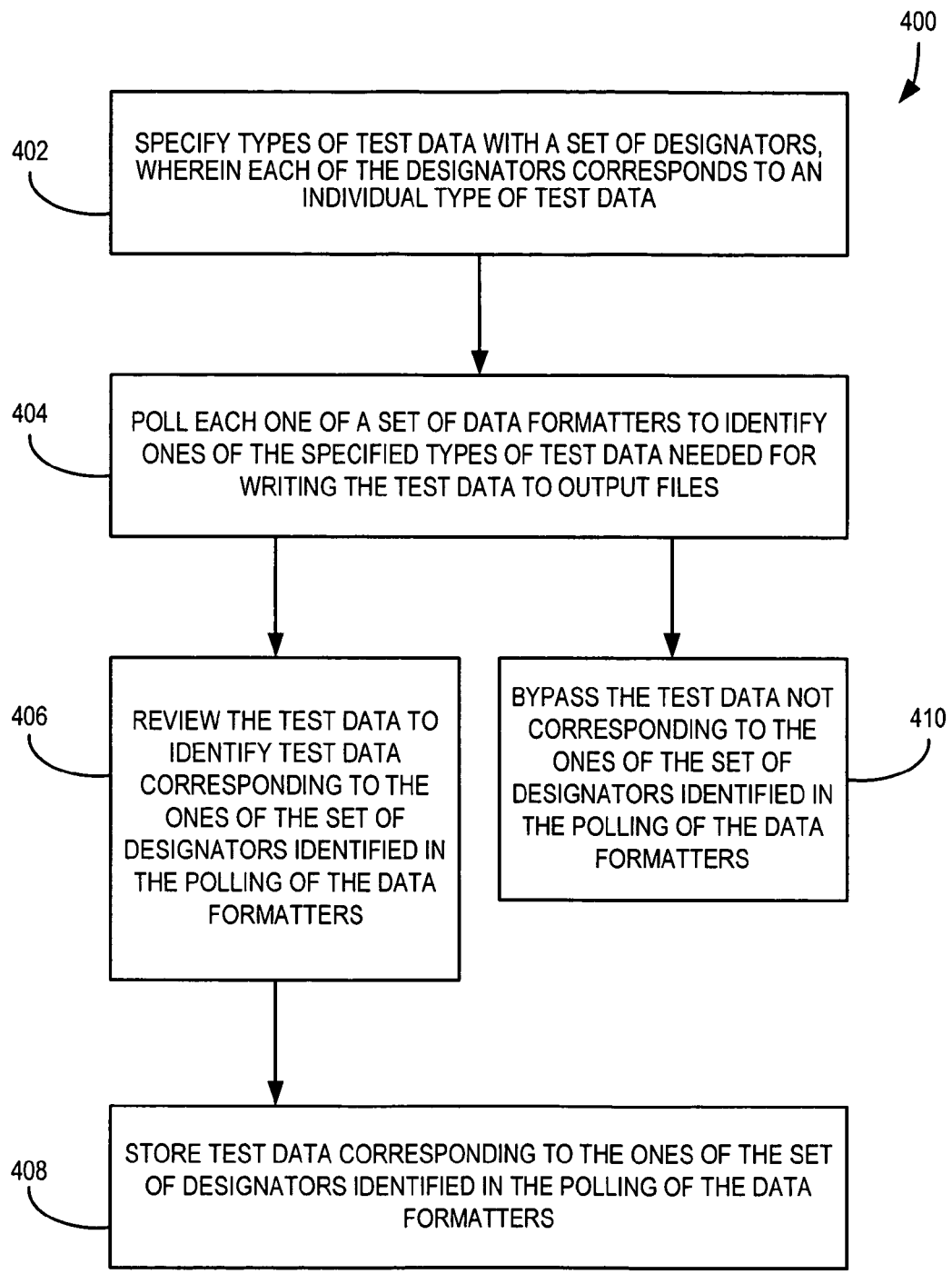

Looking now at FIG. 4, there is shown a method 400 of selectively processing test data using subscriptions in a multi-formatter architecture. In an embodiment, method 400 may include the steps of method 200.

Method 400 may comprise the step of specifying 402 types of test data with a set of designators. Each of the designators corresponds to an individual type of test data. Method 400 may also comprise the step of polling 404 each one of a set of data formatters to identify ones of the specified types of test data needed for writing the test data to output files. Method 400 may further comprise the step of reviewing 406 the test data to identify test data corresponding to the ones of the set of designators identified in the polling of the data formatters. Method 400 may comprise the step of storing 408 test data corresponding to the ones of the set of designators identified in the polling of the data formatters.

Method 400 may further include the step of bypassing 410 the test data not corresponding to the ones of the set of designators identified in the polling of the data formatters.

Figure 5:
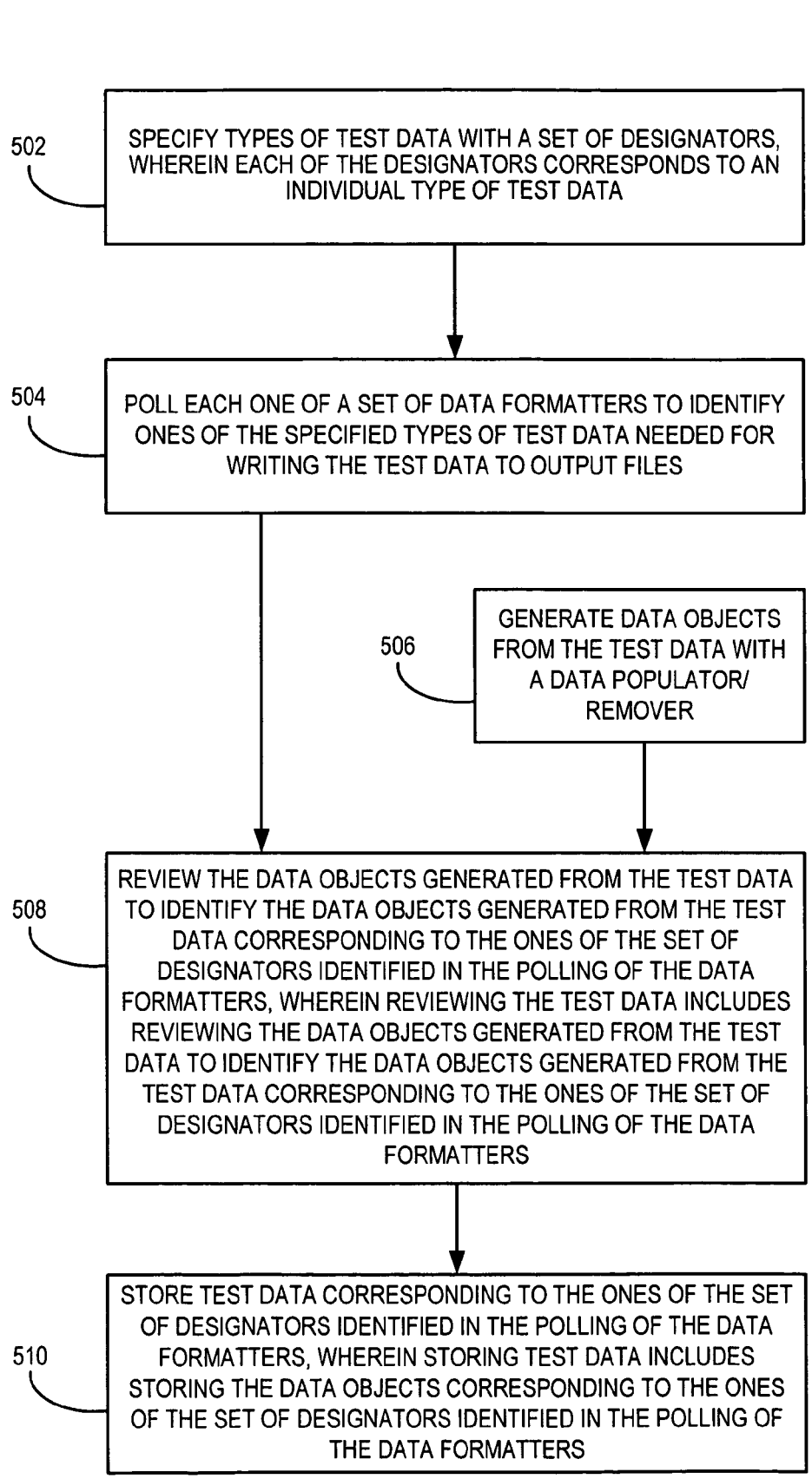

Looking now at FIG. 5, there is shown a method 500 of selectively processing test data using subscriptions in a multi-formatter architecture. In an embodiment, method 500 may include the steps of method 200.

In an embodiment, method 500 may include the steps of method 200.

Method 500 may comprise the step of specifying 502 types of test data with a set of designators. Each of the designators corresponds to an individual type of test data. Method 500 may also comprise the step of polling 504 each one of a set of data formatters to identify ones of the specified types of test data needed for writing the test data to output files. Method 500 may further comprise the step of generating 506 data objects from the test data with a data populator/remover. Method 500 may comprise the step of reviewing 508 the data objects generated from the test data to identify the data objects corresponding to the ones of the set of designators identified in the polling of the data formatters. Method 500 may further include the step of storing 510 test data includes storing the data objects corresponding to the ones of the set of designators identified in the polling of the data formatters.

Figure 6:
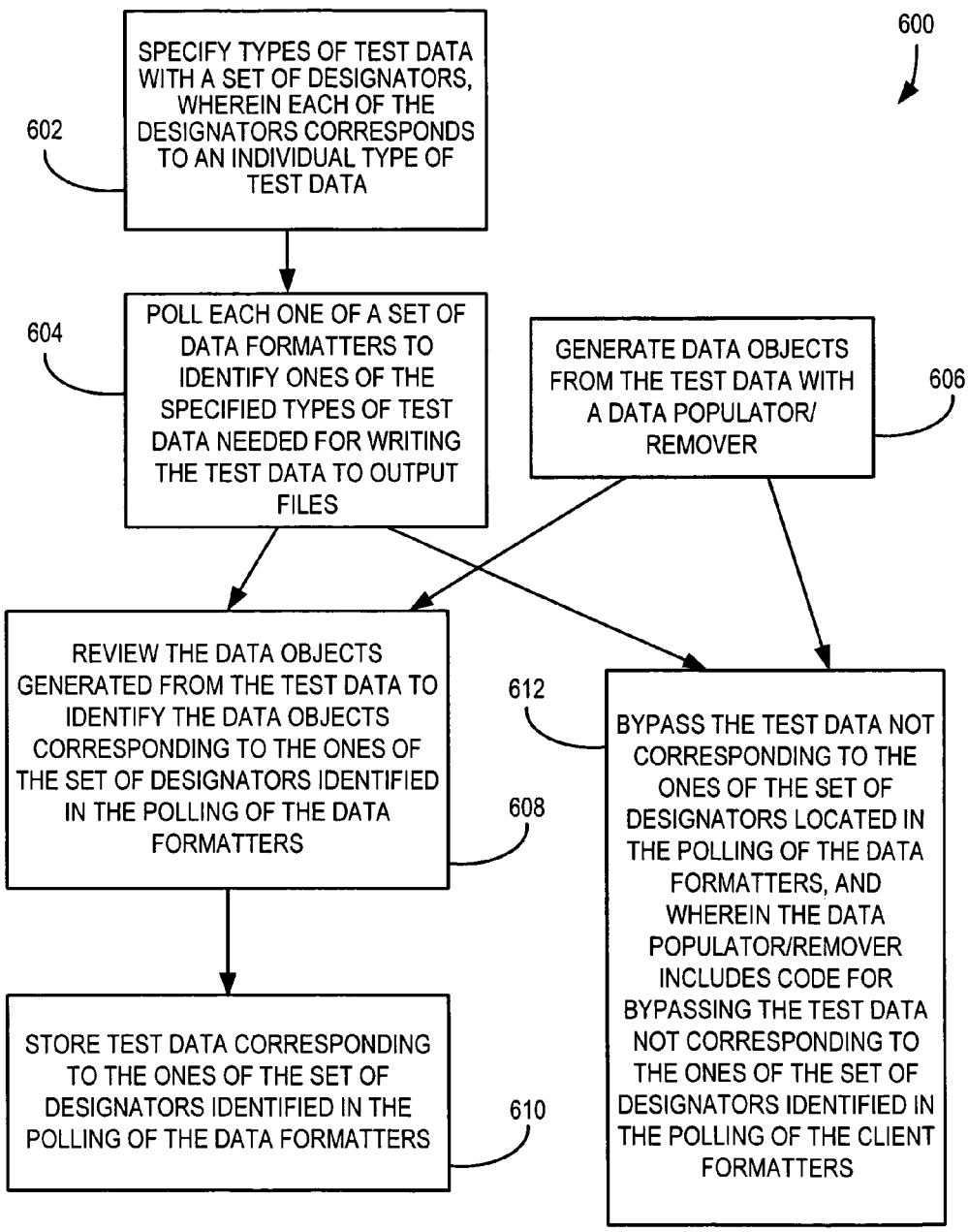

Referring to FIG. 6, there is shown a method 600 of selectively processing test data using subscriptions in a multi-formatter architecture. In an embodiment, method 600 may include the steps of method 500.

Method 600 may comprise the step of specifying 602 types of test data with a set of designators. Each of the designators corresponds to an individual type of test data. Method 600 may also comprise the step of polling 604 each one of a set of data formatters to identify ones of the specified types of test data needed for writing the test data to output files. Method 600 may further comprise the step of generating 606 data objects from the test data with a data populator/remover. Method 600 may comprise the step of reviewing 608 the data objects generated from the test data to identify the data objects corresponding to the ones of the set of designators identified in the polling of the data formatters. Method 600 may further include the step of storing 610 test data includes storing the data objects corresponding to the ones of the set of designators identified in the polling of the data formatters.

Method 600 may further comprise the step of bypassing 612 the test data not corresponding to the ones of the set of designators located in the polling of the data formatters. The data populator/remover may include code for bypassing the test data not corresponding to the ones of the set of designators identified in the polling of the client formatters.

Figure 7:
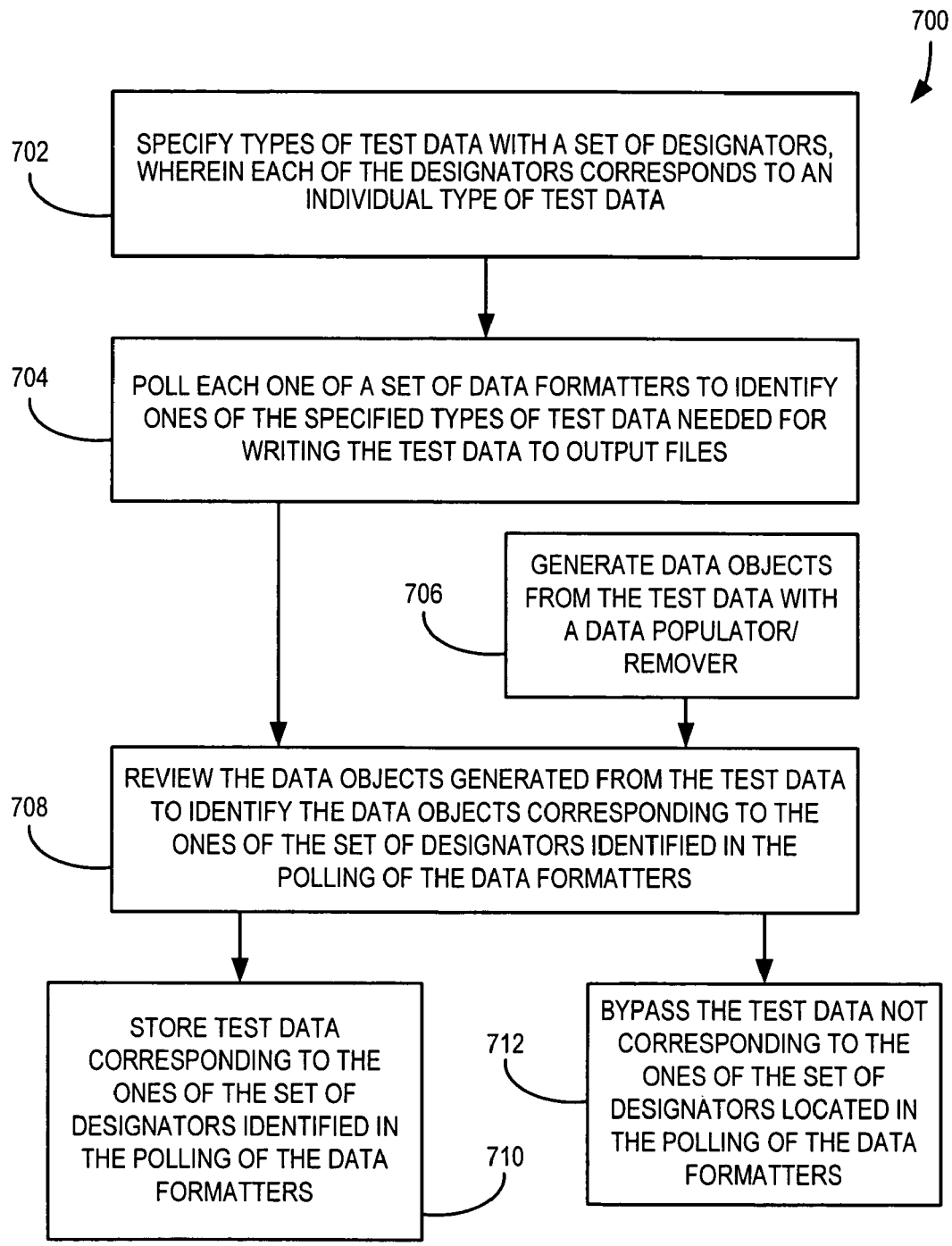

Looking at FIG. 7, there is shown a method 700 of selectively processing test data using subscriptions in a multi-formatter architecture. In an embodiment, method 700 may include the steps of method 500.

Method 700 may comprise the step of specifying 702 types of test data with a set of designators. Each of the designators corresponds to an individual type of test data. Method 700 may also comprise the step of polling 704 each one of a set of data formatters to identify ones of the specified types of test data needed for writing the test data to output files. Method 700 may further comprise the step of generating 706 data objects from the test data with a data populator/remover. Method 700 may comprise the step of reviewing 708 the data objects generated from the test data to identify the data objects corresponding to the ones of the set of designators identified in the polling of the data formatters. Method 700 may comprise the step of storing 710 test data includes storing the data objects corresponding to the ones of the set of designators identified in the polling of the data formatters. Method 702 may comprise the step of bypassing 712 the test data not corresponding to the ones of the set of designators located in the polling of the data formatters.

Figure 8:
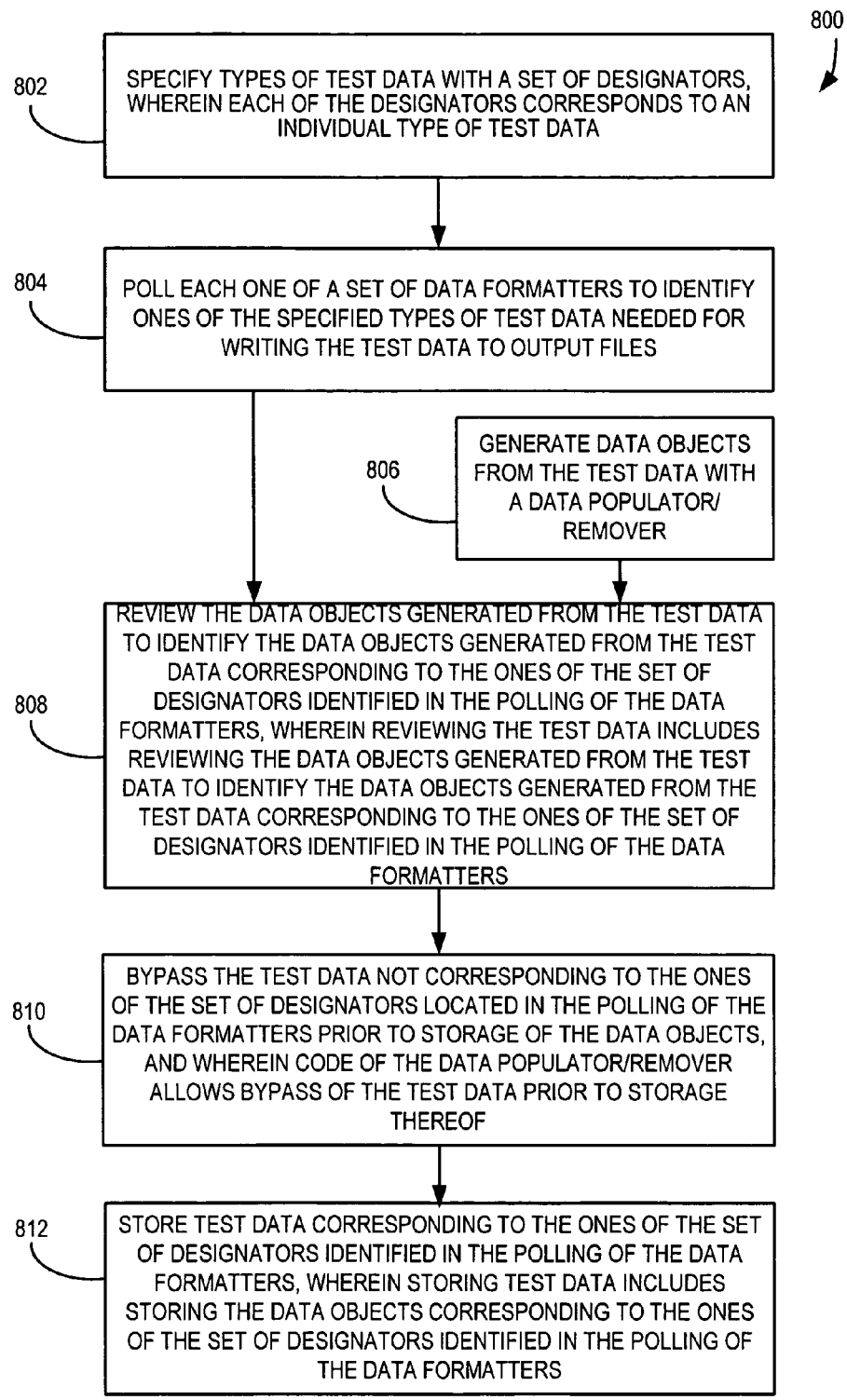

Looking now at FIG. 8, there is shown a method 800 of selectively processing test data using subscriptions in a multi-formatter architecture. In an embodiment, method 800 may include the steps of method 500.

Method 800 may comprise the step of specifying 802 types of test data with a set of designators. Each of the designators corresponds to an individual type of test data. Method 800 may also comprise the step of polling 804 each one of a set of data formatters to identify ones of the specified types of test data needed for writing the test data to output files. Method 800 may further comprise the step of generating 806 data objects from the test data with a data populator/remover. Method 800 may comprise the step of reviewing 808 the data objects generated from the test data to identify the data objects corresponding to the ones of the set of designators identified in the polling of the data formatters. Method 800 may comprise the step of storing 812 test data includes storing the data objects corresponding to the ones of the set of designators identified in the polling of the data formatters.

Method 800 may further comprise bypassing 810 the test data not corresponding to the ones of the set of designators located in the polling of the data formatters prior to the step of storing 812 the data objects. In an embodiment, the code of the data populator/remover may allow bypass of the test data prior to storage thereof.

Figure 9:
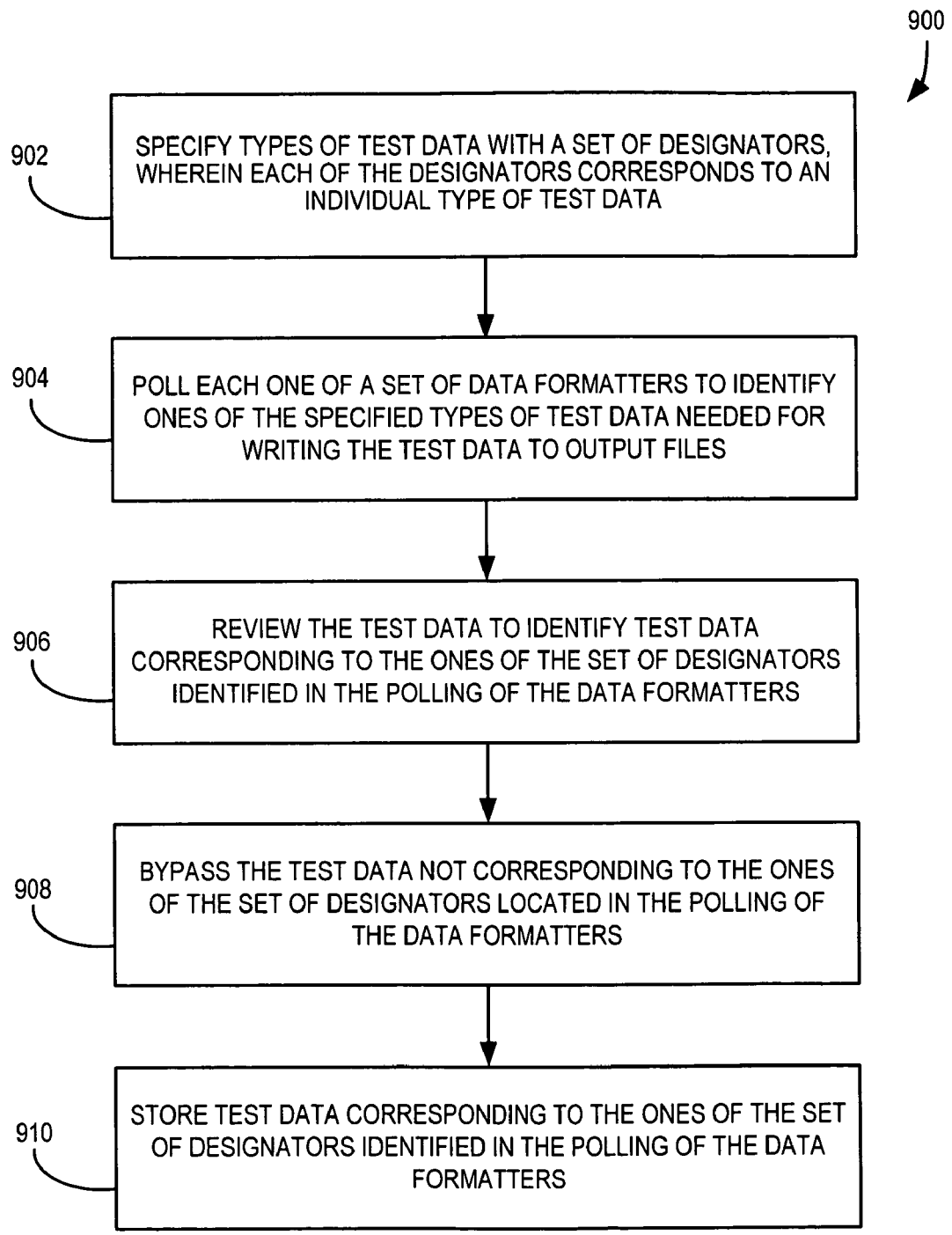

Referring to FIG. 9, there is shown a method 900 of selectively processing test data using subscriptions in a multi-formatter architecture. In an embodiment, method 900 may include the steps of method 200.

Method 900 may comprise the step of specifying 902 types of test data with a set of designators. Each of the designators corresponds to an individual type of test data. Method 900 may also comprise the step of polling 904 each one of a set of data formatters to identify ones of the specified types of test data needed for writing the test data to output files. Method 900 may further comprise the step of reviewing 906 the test data to identify test data corresponding to the ones of the set of designators identified in the polling of the data formatters. Method 900 may comprise the step of storing 910 test data corresponding to the ones of the set of designators identified in the polling of the data formatters.

In an embodiment, method 900 may further comprise bypassing 908 the test data not corresponding to the ones of the set of designators located in the polling of the data formatters prior to the step of storing 910 the data objects corresponding to the ones of the set of designators identified in the polling of the data formatters.

Figure 10:
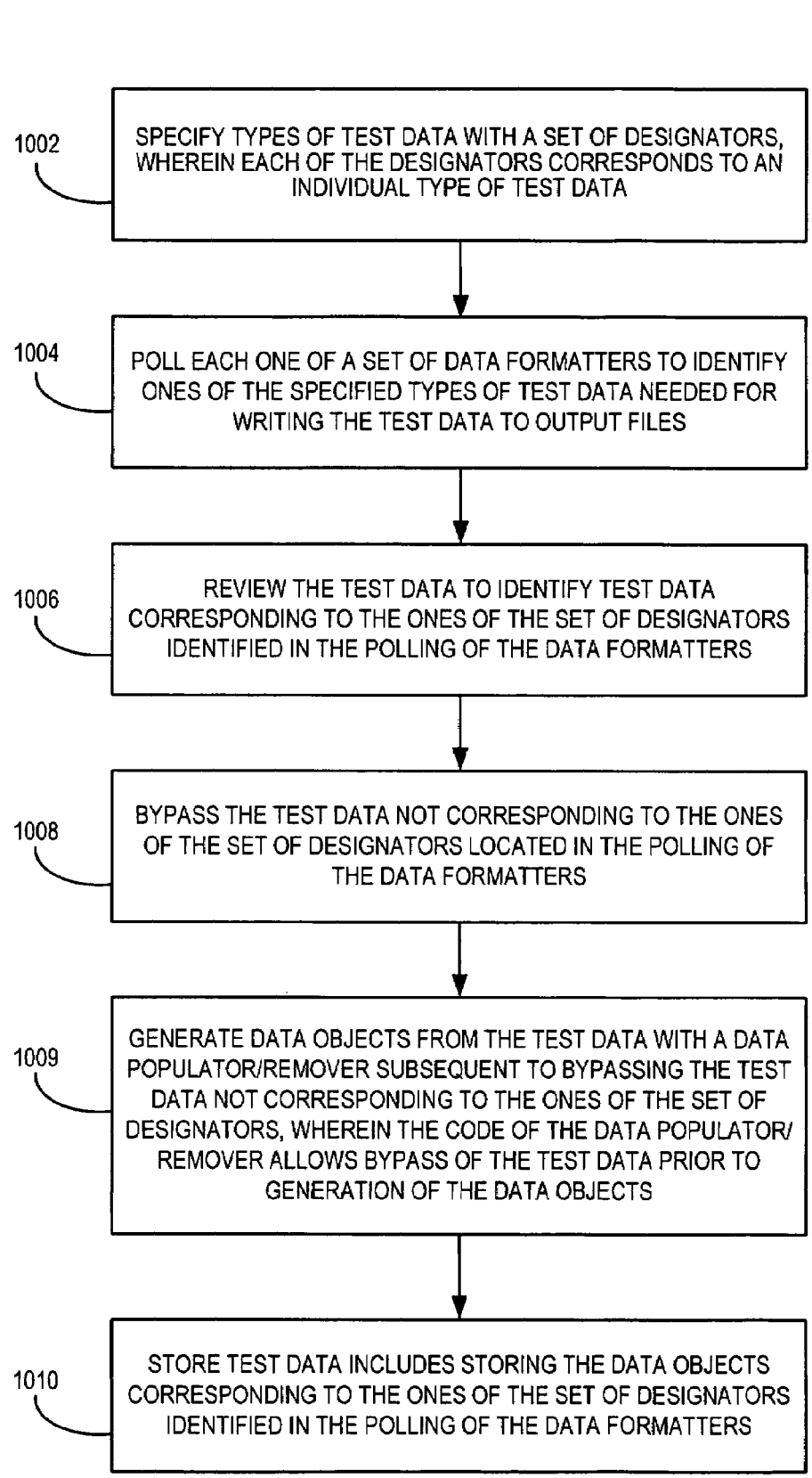

Referring to FIG. 10, there is shown a method 1000 of selectively processing test data using subscriptions in a multi-formatter architecture. In an embodiment, method 1000 may include the steps of method 900.

Method 1000 may comprise the step of specifying 1002 types of test data with a set of designators. Each of the designators corresponds to an individual type of test data. Method 1000 may also comprise the step of polling 1004 each one of a set of data formatters to identify ones of the specified types of test data needed for writing the test data to output files. Method 1000 may further comprise the step of reviewing 1006 the test data to identify test data corresponding to the ones of the set of designators identified in the polling of the data formatters. Method 1000 may comprise the step of storing 1010 test data corresponding to the ones of the set of designators identified in the polling of the data formatters. Method 1000 may comprise bypassing 1008 the test data not corresponding to the ones of the set of designators located in the polling of the data formatters prior to the step of storing 1010 the data objects corresponding to the ones of the set of designators identified in the polling of the data formatters.

In an embodiment, method 1000 may further comprise the step of generating 1009 data objects from the test data with a data populator/remover subsequent to the step of bypassing 1008 the test data not corresponding to the ones of the set of designators. The code of the data populator/remover may allow bypass of the test data prior to generation of the data objects, and wherein storing test data includes storing the data objects corresponding to the ones of the set of designators identified in the polling of the data formatters.

Figure 11:
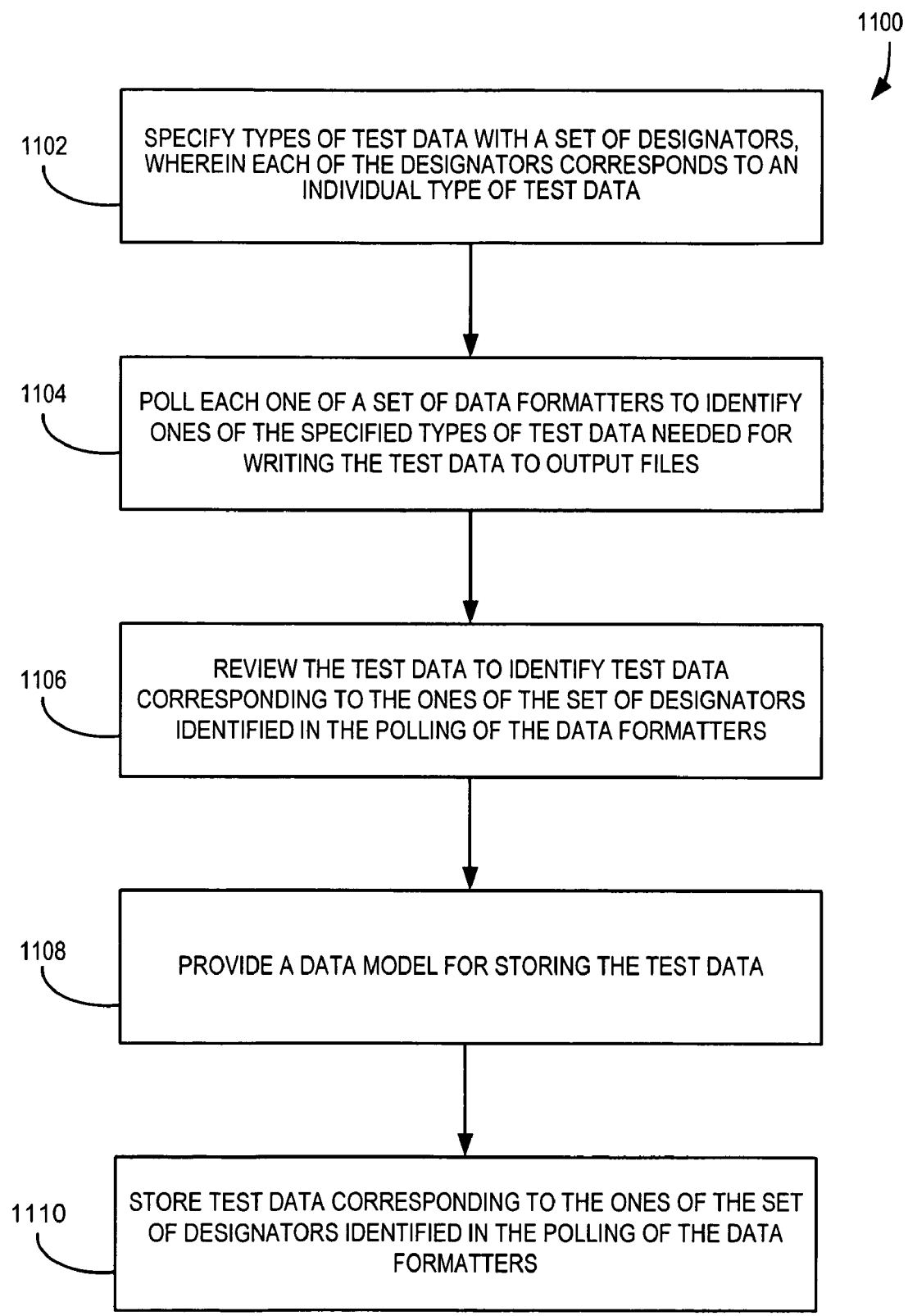

Referring now to FIG. 11, there is shown a method 1100 of selectively processing test data using subscriptions in a multi-formatter architecture. In an embodiment, method 1100 may include the steps of method 200.

Method 1100 may comprise the step of specifying 1102 types of test data with a set of designators. Each of the designators corresponds to an individual type of test data. Method 1100 may also comprise the step of polling 1104 each one of a set of data formatters to identify ones of the specified types of test data needed for writing the test data to output files. Method 1100 may further comprise the step of reviewing 1106 the test data to identify test data corresponding to the ones of the set of designators identified in the polling of the data formatters. Method 1100 may comprise the step of storing 1100 test data corresponding to the ones of the set of designators identified in the polling of the data formatters.

In an embodiment, method 1100 may further comprise the step of providing 1108 a data model for storing the test data.

Figure 12:
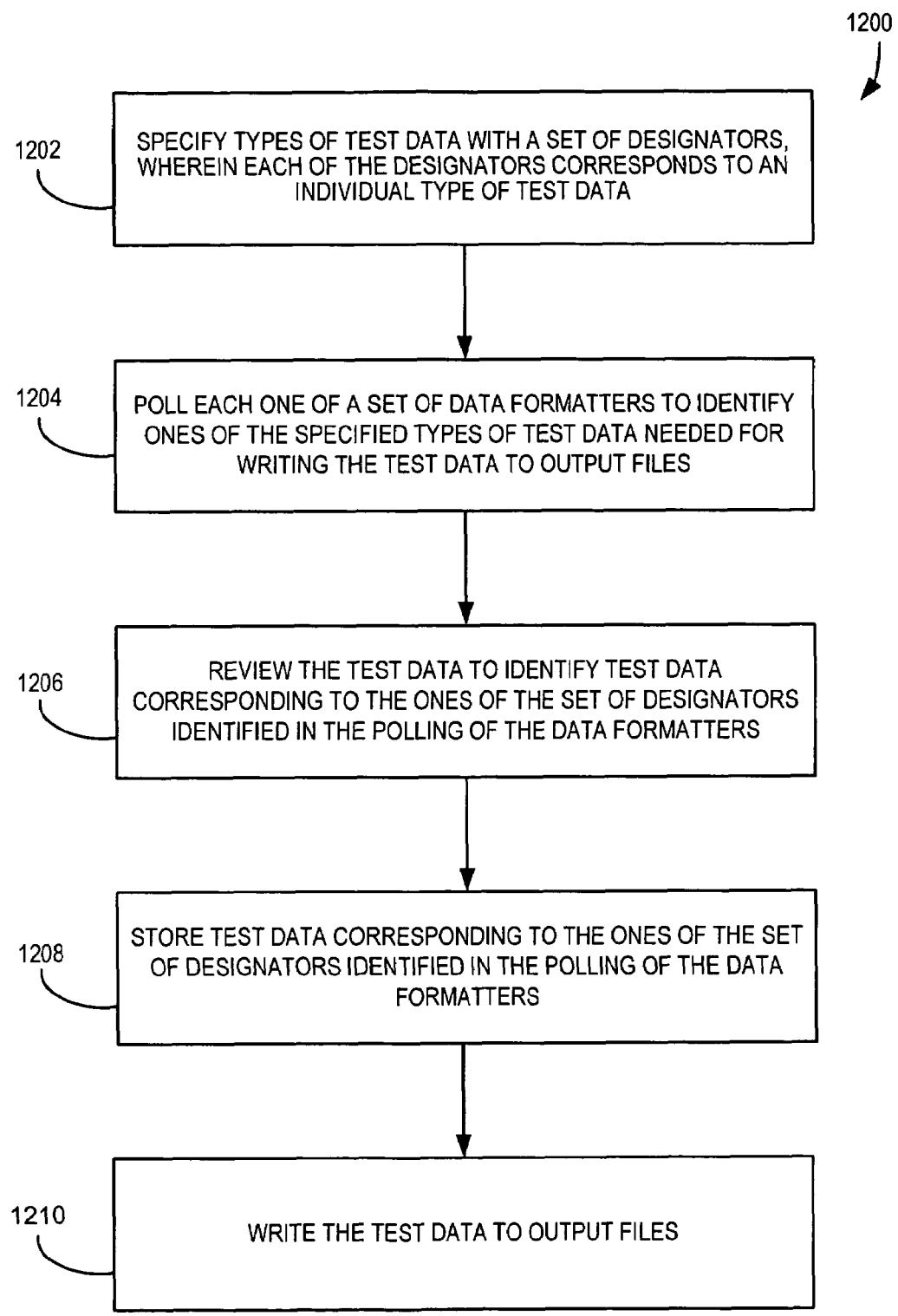

Looking at FIG. 12, there is shown a method 1200 of selectively processing test data using subscriptions in a multi-formatter architecture. In an embodiment, method 1200 may include the steps of method 200.

Method 1200 may comprise the step of specifying 1202 types of test data with a set of designators. Each of the designators corresponds to an individual type of test data. Method 1200 may also comprise the step of polling 1204 each one of a set of data formatters to identify ones of the specified types of test data needed for writing the test data to output files. Method 1200 may further comprise the step of reviewing 1206 the test data to identify test data corresponding to the ones of the set of designators identified in the polling of the data formatters. Method 1200 may comprise the step of storing 1208 test data corresponding to the ones of the set of designators identified in the polling of the data formatters.

In an embodiment, method 1200 may further include the step of writing 1210 the test data to output files.

Figure 13:
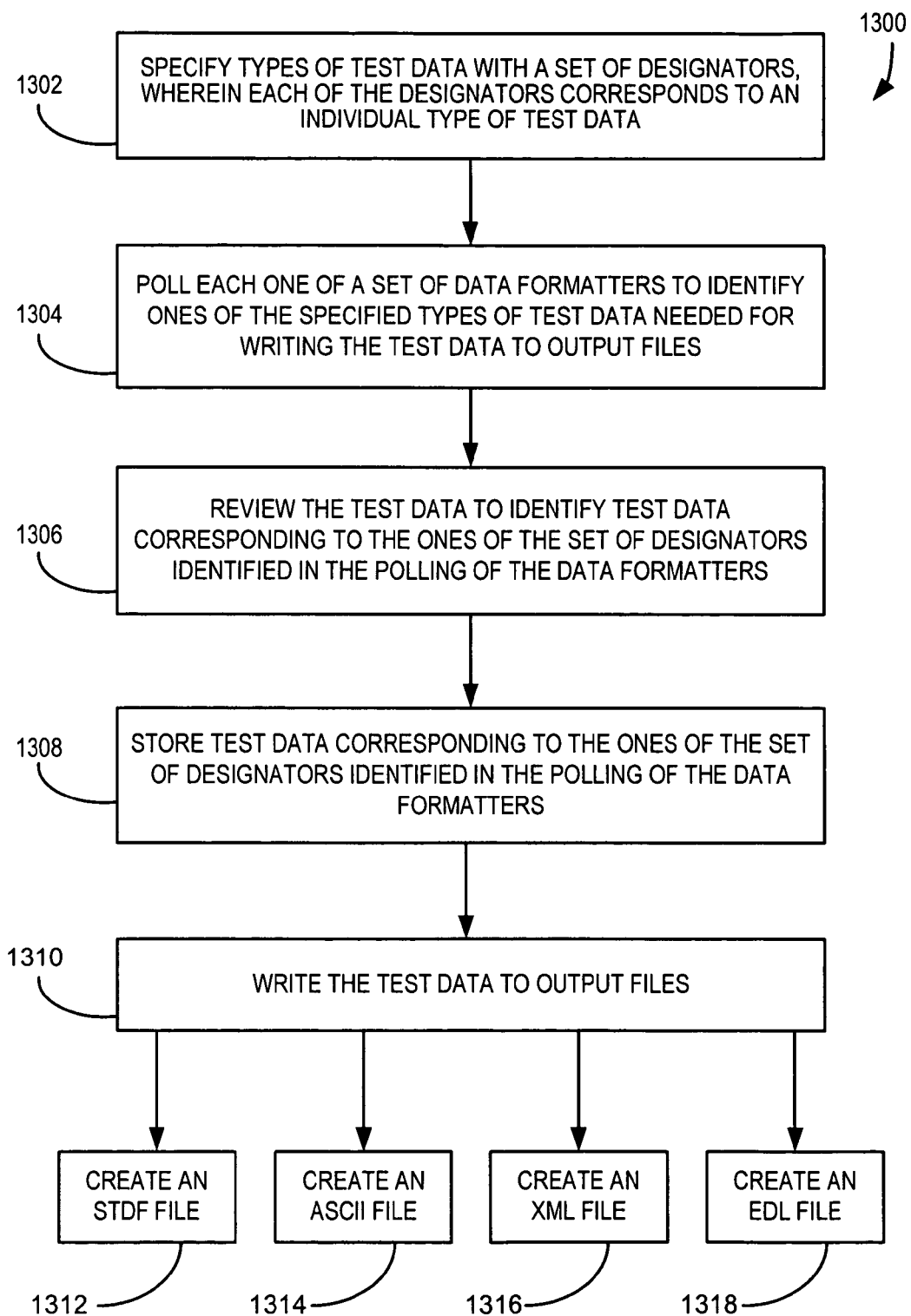

Looking now at FIG. 13, there is shown a method 1300 of selectively processing test data using subscriptions in a multi-formatter architecture. In an embodiment, method 1300 may include the steps of method 1200.

Method 1300 may comprise the step of specifying 1302 types of test data with a set of designators. Each of the designators corresponds to an individual type of test data. Method 1300 may also comprise the step of polling 1304 each one of a set of data formatters to identify ones of the specified types of test data needed for writing the test data to output files. Method 1300 may further comprise the step of reviewing 1306 the test data to identify test data corresponding to the ones of the set of designators identified in the polling of the data formatters. Method 1300 may comprise the step of storing 1308 test data corresponding to the ones of the set of designators identified in the polling of the data formatters. Method 1300 may comprise the step of writing 1310 the test data to output files.

In an embodiment, method 1300 may further comprise the step of creating 1312, 1314, 1316, 1318 one or more of an STDF file, an ASCII file, an XML file, and an EDL file, respectively.

In an embodiment, method 1300 may comprise the step of creating 1312 at least one STDF file. In one embodiment, method 1300 may comprise the step of creating 1314 at least one ASCII file. In another embodiment, method 1300 may comprise the step of creating 1316 at least one XML file. In an embodiment, method 1300 may comprise the step of creating 1318 at least one EDL file.

What is claimed is:

1. A system, comprising:
    a memory;
    a set of designators specifying types of test data, wherein each of the designators corresponds to an individual type of test data;
    a set of client formatters, each of the client formatters i) identifying at least one of the designators corresponding to types of test data needed for writing the test data to output files, ii) retrieving from the memory test data corresponding to the identified at least one of the designators, and iii) writing formatted test data to an output file; and
    a monitor for i) receiving test data from an event logging source, ii) polling the client formatters for the ones of the set of designators identified by the set of client formatters, iii) reviewing the received test data, and iv) selectively storing in the memory only the types of received test data corresponding to the ones of the designators identified in the polling of the client formatters.

2. A system in accordance with claim 1, wherein the test data is stored in the memory in data objects.

3. A system in accordance with claim 1, wherein the monitor includes a data populator/remover for generating data objects from the test data.

4. A system in accordance with claim 3, further comprising a data model for storage of the test data corresponding to the ones of the designators identified in the polling of the client formatters.

5. A system in accordance with claim 1, wherein the client formatters include at least one selected from the group consisting of an STDF writer, an ASCII writer, an XML writer, and an EDL writer.

6. A method, comprising:
   via a monitor process,
   polling a set of client formatters for designators of individual types of data that have been identified by the client formatters;
   receiving test data from an event logging source;
   reviewing the received test data and selectively storing in a memory only the types of received test data corresponding to the designators identified in the polling of the set of client formatters; and
   notifying each of the client formatters when test data corresponding to the types of data identified has been stored in the memory; and
   via the client formatters, retrieving the test data stored in the memory and writing the test data to output files.

7. A method in accordance with claim 6, further comprising providing a data model for storing the test data.

8. A method in accordance with claim 6, wherein writing the test data to the output files creates at least one selected from the group consisting of an STDF file, an ASCII file, an XML file, and an EDL file.

9. A method in accordance with claim 6, wherein the output files include at least one STDF file.

10. A method in accordance with claim 6, wherein the output files include at least one ASCII file.

11. A method in accordance with claim 6, wherein the output files include at least one XML file.

12. A method in accordance with claim 6, wherein the output files include at least one EDL file.

* * * * *